J. M. WILSON.
ELECTRIC CURRENT GENERATOR.
APPLICATION FILED DEC. 4, 1912.
1,142,866.
Patented June 15, 1915.
2 SHEETS—SHEET 2.
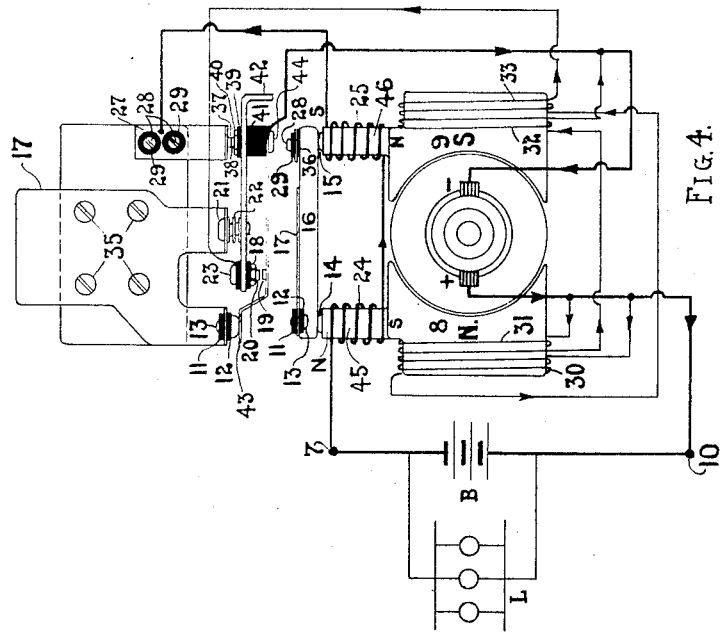
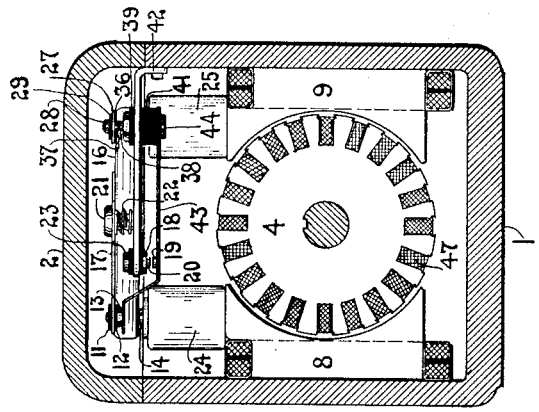
WITNESSES
INVENTOR
ATTORNEY

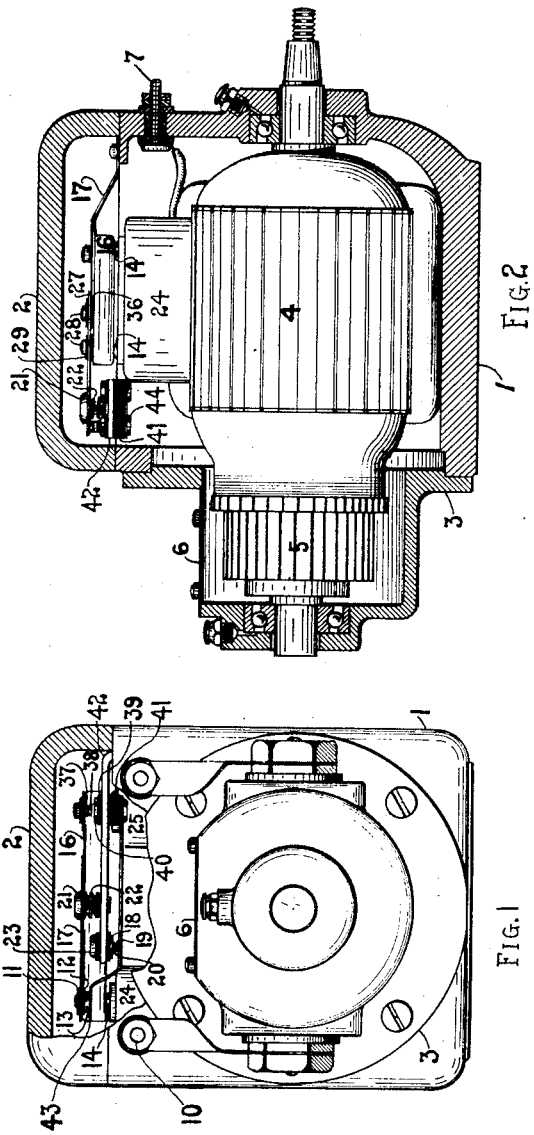

UNITED STATES PATENT OFFICE.

JAMES M. WILSON, OF NEWARK, NEW JERSEY, ASSIGNOR TO SPLITDORF ELECTRICAL COMPANY, OF NEWARK, NEW JERSEY.

ELECTRIC-CURRENT GENERATOR.

1,142,866.  Specification of Letters Patent.  Patented June 15, 1915.

Application filed December 4, 1912. Serial No. 734,958.

*To all whom it may concern:*

Be it known that I, JAMES M. WILSON, a citizen of the United States, and a resident of Newark, county of Essex, and State of New Jersey, have invented certain new and useful Improvements in Electric-Current Generators, of which the following is a specification.

My invention relates to improvements in electric generators of the direct current class, and has for its object, to provide an improved form of direct current generator, adapted to be driven at variable rates of speed, such as on automobiles, launches and other moving vehicles and to control the supply of current to the working circuit, according to the requirements.

In carrying out my invention in the form shown and described herein, I provide a complete housing for the working mechanism of the generator, which housing serves as supports for the armature bearing and as a conductor of the magnetic flux. This housing, also serves to keep out water, dirt and other foreign matter from the interior mechanism of the generator.

An electric-current generator used on a variable speed vehicle, must have its working circuit controlled so that it will close the working circuit at a substantially predetermined rate of speed of the vehicle and it should also have under self control, means to keep the energy in the working circuit to a safe predetermined amount, when the vehicle to which it is attached and which it furnishes the motive power, is moving at a high rate of speed.

In my application, Serial No. 730,567, I have shown an electric generator, in which the main field flux is furnished by permanent magnets. In my present application, I have dispensed with the permanent magnets and use the ordinary electromagnetic construction, but I employ a different method of controlling the output, of the generator than that shown in the above mentioned application.

My invention comprises novel details in the arrangement of the electromagnetic windings and disposition of the magnetic fields, all of which will be more fully hereinafter described and pointed out in the appended claims.

Reference is to be had to the accompanying drawings forming a part hereof, wherein,—

Figure 1 is an end view of the generator, with a portion of the cover and frame cut away to expose the mechanism which controls the working circuit. Fig. 2 is a longitudinal section of the field frame, showing the armature in full and a portion of one of the main field coils, together with a projection of the corresponding pole piece and keeper, which, when operated, controls the various circuits. Fig. 3 is an end view of Fig. 2, with the frame and armature in section, but showing in outline, the pole pieces with their extensions and keeper controlling the working circuit. Fig. 4 is a diagrammatic arrangement of the circuits used in connection with the generator.

Numeral 1 illustrates the main housing of the generator, and 2, the cover therefor.

3 represents a removable bearing, so that the armature 4 and commutator 5, can be easily taken from the housing.

6 is a removable cover for easy inspection of the commutator while the machine is running.

7 is an insulated terminal to which the interior connection of the working circuit is attached.

8 and 9 are the pole pieces, which may be separately attached to the field frame or housing, or they may be integral therewith.

10 illustrates one of the line terminals connected directly to one of the commutator brushes.

11 and 12 are insulating bushings which insulate the button 13 from the spring 17.

14 and 15 are non-magnetic stops to hold the keeper 16 away from the polar extensions 45 and 46, when said keeper is attracted toward said polar extensions.

23 is a stud to which one of the shunt windings is attached. This stud is mounted on an arm 42 attached to the housing 1 and held securely in place by a nut 18. Mounted on the end of this stud is a platinum or other suitable contact, 20, which is normally in engagement with a similar contact, 19, which is mounted on spring 43.

21 is an adjusting screw for adjusting the relation between springs 17 and 43, this adjustment being aided by a spiral spring 22, wound around the stud 21.

24 and 25 are coils wound around the respective polar projections 45 and 46. These polar projections are preferably integral with the pole pieces 8 and 9 and in the preferred form shown herein, extend upward, substantially parallel with the walls of the housing and terminating in the same plane as the top of the housing, so that only one milling operation is necessary to face off the top of the housing and the polar extensions, thus reducing the machine work on the generator to a minimum.

Around the pole pieces 8 and 9 are disposed the windings 30, 31, 32 and 33, which windings are connected in shunt across the brushes of the generator. One of these windings, consisting of coil 30 on pole piece 8 and coil 33 on pole piece 9, is connected to the stud 23, contacts 20 and 19 and spring 43. Contacts 20 and 19 are closed when the machine is idle and remains closed until the speed of the vehicle, to which the armature is suitably connected, reaches a predetermined point and these contacts are separated by the action of keeper 16, through the agency of the insulated button 13 attached to spring 17, carried by the keeper. Until this predetermined speed point is reached, coils 30, 31, 32 and 33 act together to furnish the main excitation for the armature. A part of the flux set up by these coils passes through the polar extensions 45 and 46 and keeper 16, back through the housing 1. Said flux path may be considered as a leakage path away from the armature. When this leakage attains a certain value, the keeper 16 is partially attracted toward the polar extensions 45 and 46, this action closes the contacts 37 and 38. The contact 37 is mounted on terminal 27 by screws 28 and insulated therefrom by insulating bushings 29. The contact 38 is mounted on a stud 44, carried by the arm 42 and insulated therefrom by the insulators 39 and 41 being held by the screws 44. A lead from one of the commutator brushes is connected to the stud 44 and one end of the coil 25 is connected to the terminal 27. The other end of the coil 25 is connected to one end of the coil 24, the other end of which is connected to the line terminal 7. Connected to the line binding post 7 and 10, may be any translating devices, such as battery "B" and lamps "L". When the keeper 16 has been partially attracted, as aforesaid, contacts 37 and 38 are closed, thereby closing the working circuit for the armature, through said translating devices. This working circuit may be easily traced by the heavy lines. The coils 24 and 25 are so wound and arranged on the polar extensions 45 and 46, as to produce a flux through the same, in the same direction as the shunt coils, but when current through them attains a certain value a portion of this flux finds its way back through the armature in opposition to the shunt winding. Furthermore when current through coils 24 and 25 attains a certain value, depending on the speed of the vehicle, the conjoint action of these coils, together with the shunt coils, attracts keeper 16 all the way until it hits against the non-magnetic separators 14 and 15. In this position of the keeper, the contacts 19 and 20 are separated, while the working circuit is kept closed. The separation of contacts 19 and 20 opens the circuit of coils 30 and 33, thus reducing the flux generated by these coils. By this reduction of flux and the further reduction due to the differential action of the coils 24 and 25, as above mentioned, the current in the working circuit is held at a practically constant value, as the speed increases beyond the predetermined point for which adjustment had been made. As the speed decreases the reverse action takes place as regards the closing of the contacts 19 and 20 and the opening of the contacts 37 and 38, so that the operation of the machine is entirely automatic and the control of the working circuit is entirely within and a part of the operation of the generator itself.

Instead of having these various control features outside of the generator, I prefer to put them all inside the housing, where they are protected from dirt and water and mechanical injury, thus making a very compact and efficient type of generator, as well as low in cost of manufacture.

While I am aware that the various details shown may be rearranged and put up in a different form by one skilled in the art, yet, those alterations and substitutions will all be within the scope of the appended claim.

What I desire to claim, is:—

1. In an electric generator, the combination of a box type field frame and a removable cover therefor, an armature rotatable within said frame and a working circuit for said armature, pole pieces attached to said frame, and having polar projections extending to the top of said frame, energizing coils carried on both the pole pieces and polar projections, and a keeper in correlation with said polar projections to control the current in the working circuit, substantially as described.

2. In an electric generator, the combination of a magnetic field frame, an armature and a working circuit therefor, pole pieces attached to said magnetic field, projections on said pole pieces extending substantially parallel to the walls of the housing and terminating in the same plane as said walls, windings around the pole pieces and in shunt to said working circuit, windings on said polar projections and included in the working circuit, a keeper in conjunction with the polar projections and controlling the working circuit, substantially as described.

3. In an electric generator, the combination of a magnetic field frame, an armature and a working circuit therefor, an exciting circuit for said field frame, a keeper mounted on said field frame controlling working and exciting circuits, said keeper having three positions, a normal position, in which the working circuit is open and the exciting circuit is closed, a second position in which the working and exciting circuits are closed, a third position in which the working circuit is closed and a portion of the exciting circuit is opened, substantially as and for the purpose described.

4. In an electric generator, the combination of a magnetic field frame, an armature and a working circuit therefor, a keeper and contacts controlled thereby, an exciting circuit for said field frame and in shunt to said working circuit, a second exciting circuit, including the working circuit, said keeper being operated by the conjoint action of said exciting circuits whereby the current in the working circuit is controlled to a substantially predetermined value, as described.

5. In an electric generator, the combination of a field frame, an armature and a working circuit therefor, pole pieces attached to the field frame and having polar extensions, said pole pieces carrying a plurality of exciting windings connected in shunt to said working circuit, and said polar extensions having exciting windings connected in series in the working circuit, a keeper for said polar extensions and adapted to be partially operated by the influence of the shunt windings, whereby the working circuit is closed and further adapted to be completely operated by the conjoint influence of the said shunt and series windings, whereby the working circuit is maintained, but a portion of the shunt winding is removed from circuit, substantially as and for the purpose described.

6. In an electric generator adapted to be driven at a variable speed, the combination of a frame, an armature, a working circuit for said armature, shunt and series exciting coils for said frame, a keeper within said frame for controlling the working circuit and operated by the conjoint actions of the said shunt and series coils, said keeper in its cycle of operation having a normal, an intermediate and fully operated position, substantially as described.

7. In an electric generator, the combination of a frame, an armature and a working circuit therefor, pole piece attached to said frame, a plurality of windings on said pole pieces, said pole pieces having polar projections carrying windings, a keeper controlling the working circuit and the circuit through one of the windings on said pole pieces and adapted to be attracted toward said polar projections, first through the agency of the windings on said pole pieces, second, through the conjoint agency of the windings on the pole pieces and the windings on the polar projections, whereby the working circuit is controlled as described.

8. In an electric generator, the combination of a frame, an armature and a working circuit therefor, pole pieces carrying windings adapted to send magnetic flux through the armature in a given direction, polar projections on said pole pieces carrying windings adapted to send magnetic flux through the armature in opposition to the first mentioned flux, a keeper for said polar projection, said keeper controlling the electrical circuits of said generator, both said windings acting conjointly to send magnetic flux through the polar projections and keeper in the same direction, whereby said keeper is operated at a predetermined speed, substantially as and for the purpose described.

9. In an electric generator, the combination of a field frame, an armature and a working circuit therefor, electro-magnetic windings associated with said frame and armature, means within said field frame and under the control of said electro-magnetic windings for regulating the current in the working circuit, said means having a normal, an intermediate, and a fully operated position, substantially as and for the purpose described.

10. In an electric generator, the combination of a housing of magnetic material, an armature and a working circuit therefor, pole pieces, extending from said housing and carrying windings connected in shunt to said working circuit, polar projections on said pole pieces, extending substantially parallel to the side walls of the housing, windings on said polar projections in series with the working circuit, a keeper flexibly connected to said housing and extending over said polar projections, contact points carried by said keeper, one of said contact points being normally open and in the working circuit, a second contact point carried by said keeper being normally closed on its associate point and included in one of said shunt windings, said keeper being adapted to be partially operated by the said shunt windings, whereby the working circuit is closed, and being further adapted to be fully operated by the combined influence of said shunt and series windings when the current in the working circuit attains a substantially predetermined value, whereby said second pair of contacts are opened and a portion of the shunt windings is removed from circuit and the flux through said armature is reduced thereby and further by the differential action of said series windings on said polar projections, whereby the current in the working circuit is controlled as the speed varies, substantially as described.

11. In an electric generator, the combination of a field frame, an armature and a working circuit therefor, pole pieces attached to the field frame and having polar extensions, said pole pieces carrying an exciting winding connected in shunt to said working circuit, and said polar extensions having exciting windings connected in series in the working circuit, a keeper for said polar extensions, a pair of contacts in the circuit of said shunt winding, said pair of contacts adapted to be controlled by said keeper, said keeper adapted to be partially operated by the influence of the shunt winding, whereby the working circuit is closed and further adapted to be completely operated by the conjoint influence of said shunt and series windings, whereby the working circuit is maintained but said pair of contacts in said shunt circuit are opened for the purpose described.

12. In an electric generator, the combination of a frame, an armature and a working circuit therefor, pole pieces attached to said frame, windings on said pole pieces, said pole pieces having polar projections carrying windings, a keeper controlling the working circuit and the circuit through said windings on said pole pieces and adapted to be attracted toward said polar projections, first through the agency of the windings on said pole pieces, secondly, through the conjoint agency of the windings on the pole pieces and the windings on the polar projections, whereby the current in the working circuit is controlled, as described.

In testimony whereof, I affix my signature in the presence of two witnesses.

JAMES M. WILSON.

Witnesses:
GAIL O. PORTER,
GEORGE L. LANG.